United States Patent [19]
Shimizu et al.

[11] 4,443,183
[45] Apr. 17, 1984

[54] COMBUSTION APPARATUS

[75] Inventors: Shoji Shimizu; Hiroyuki Mitsudomi, both of Osaka, Japan

[73] Assignee: Osaka Gas Company Limited, Osaka, Japan

[21] Appl. No.: 400,289

[22] Filed: Jul. 21, 1982

[30] Foreign Application Priority Data

Jul. 21, 1981 [JP] Japan .............. 56-108997[U]
Sep. 14, 1981 [JP] Japan .............. 56-145340
Sep. 14, 1981 [JP] Japan .............. 56-145342

[51] Int. Cl.³ ..................................... F23D 13/40
[52] U.S. Cl. ..................................... 431/354; 431/12
[58] Field of Search ............... 431/354, 4.12, 127, 431/188, 284, 62

[56] References Cited
U.S. PATENT DOCUMENTS 3,958,915  5/1976  Noda et al. ............... 431/4 X
4,017,253  4/1977  Wielang et al. ............ 431/10 X
4,157,889  6/1979  Bonnel ..................... 431/8 X Primary Examiner—Samuel Scott
Assistant Examiner—Randall L. Green
Attorney, Agent, or Firm—Wenderoth, Lind & Ponack

[57] ABSTRACT

A combustion apparatus for combusting fuel in a combustion furnace utilizes air which is enriched with oxygen through an oxygen permselective membrane and which is fed via a first piping line to the combustion furnace by a vacuum pump. A bypass piping line is connected with the upstream side and the downstream side of the vacuum pump and is equipped with a control valve. A second piping line has one end connected with the first piping line between the vacuum pump and the oxygen permselective membrane and another end open to the atmosphere, and is equipped with a control valve. A third piping line has one end connected with the first piping line between the vacuum pump and the combustion furnace and another end open to the atmosphere, and is equipped with a control valve.

3 Claims, 3 Drawing Figures

COMBUSTION APPARATUS

BACKGROUND OF THE INVENTION

1. Field of the Invention

The present invention relates to a combustion apparatus for combusting fuel in a combustion furnace by utilizing air which is enriched with oxygen through an oxygen permselective membrane and which is fed via a piping line to the combustion furnace by a vacuum pump.

2. Description of the Prior Art

Owing to achieving high temperatures such as 1800°–1900° C. in manufacturing of high grade china and artificial jewels, a combustion apparatus, in which fuel is combusted by utilizing air enriched with oxygen through an oxygen permselective membrane, has been proposed. In this combustion apparatus, it is preferred that the quantity of air for combustion and the oxygen concentration of the air are varied voluntarily with varying of the combustion load in a combustion furnace.

It is an object of this invention to provide a combustion apparatus in which the quantity of air for combustion and the oxygen concentration can be varied voluntarily.

SUMMARY OF THE INVENTION

To accomplish the foregoing object, there is provided a combustion apparatus for combusting fuel in a combustion furnace by utilizing air which is enriched with oxygen through an oxygen permselective membrane and which is fed via a first piping line to the combustion furnace by a vacuum pump. A bypass piping line provided is connected to the first piping line at the upstream side and the downstream side of the vacuum pump and is equipped with a control valve. A second piping line has one end connected with the first piping line between the vacuum pump and the oxygen permselective membrane and another end open to the atmosphere, and is equipped with a control valve. A third piping line has one end connected with the first piping line between the vacuum pump and the combustion furnace and another end open to the atmosphere, and is equipped with a control valve.

According to the invention, the quantity of air enriched with oxygen fed to the combustion furance and the oxygen concentration of the air can be varied voluntarily in the combustion apparatus by means of a simple structure.

BRIEF DESCRIPTION OF THE DRAWINGS

A detailed description of the invention will be made with reference to the accompanying drawings wherein like numerals designate corresponding parts in the figures.

DETAILED DESCRIPTION OF THE PREFERRED EMBODIMENTS

Figure 1:
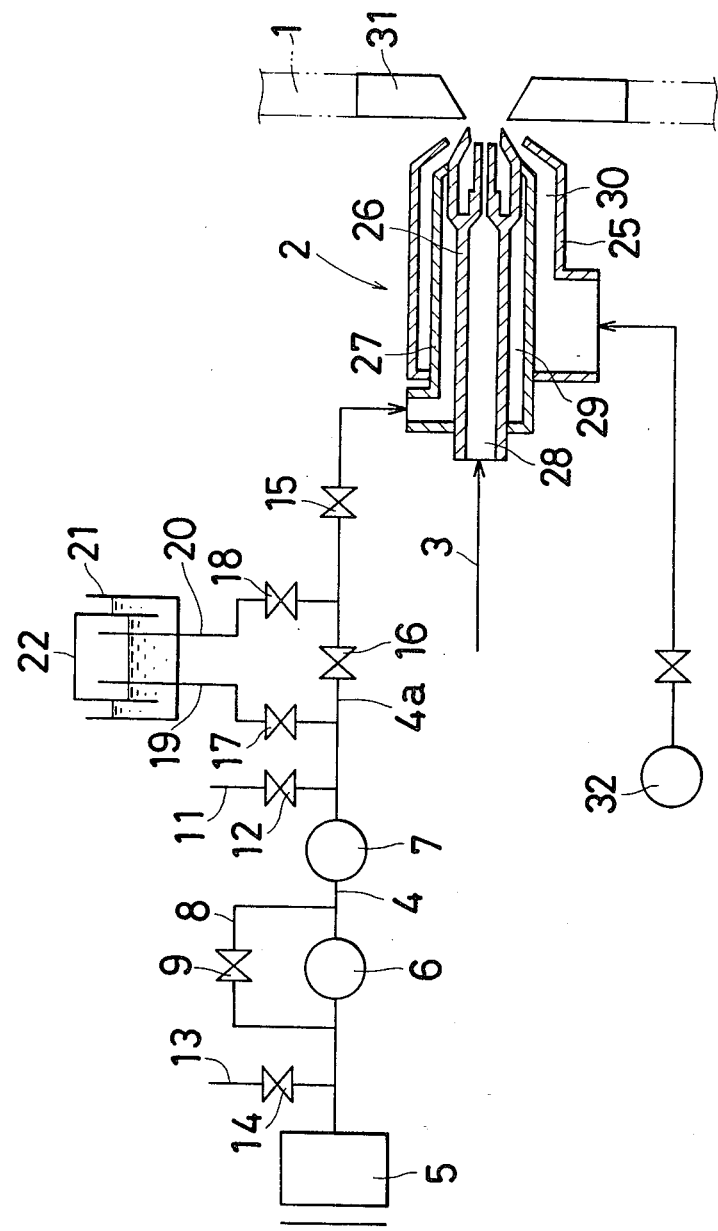
FIG. 1 is a schematic view of an embodiment of the invention.

FIG. 1 is a flow sheet according to an embodiment of the invention. Liquid fuel is fed via a piping line 3 to a burner 2 mounted on a combustion furnace 1. Air for combustion, which is enriched with oxygen through a oxygen permselective membrane 5, is fed to the burner 2 via a piping line 4 equipped with a vacuum pump 6 and a fan 7. Due to combustion of the liquid fuel with the air enriched with oxygen, the liquid fuel can be combusted at a high temperature in the combustion furnace 1.

The oxygen permselective membrane 5 is a high polymer membrane, for example, polydimethylsiloxane. Furthermore, a high polymer membrane, the oxygen permselectivity of which is $10^{-10}$ to $10^{-7}$ (cm/cm$^2$.sec.cmHg) and the ratio of oxygen permselectivity and nitrogen permselectivity of which is more than 2, is suitable as the oxygen permselective membrane 5.

Figure 2:
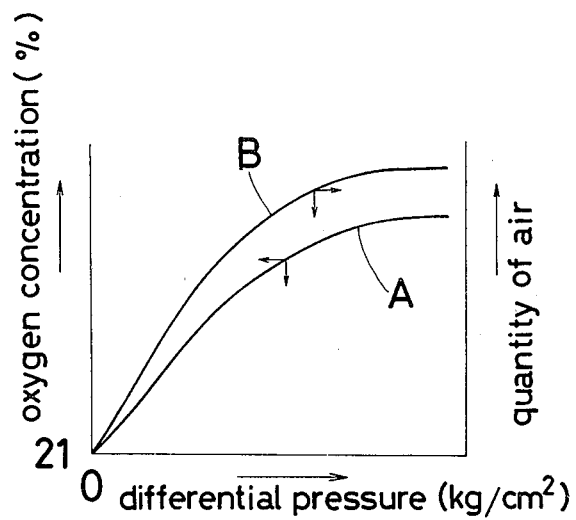
FIG. 2 is a graph showing characteristics of an oxygen permselective membrane.

FIG. 2 is a graph showing characteristics of the oxygen permselective membrane 5. The oxygen permselective membrane 5 enriches oxygen concentration of air permeated through the oxygen permselective membrane 5 with increasing differential pressure between a frontside and a backside of the oxygen permselective membrane 5 as a curved line A shows. Moreover, the oxygen permselective membrane 5 increases the quantity of air permeated through the oxygen permselective membrane 5 with increasing differential pressure as a curved line B shows. Thus, for concentrating and separating gas through the oxygen permselective membrane 5, a difference of pressure between the frontside and the backside of the oxygen permselective membrane 5 should be provided. Accordingly, it is preferable to pressurize the frontside of the oxygen permselective membrane 5. According to a experiment by the inventors, however, the separation of oxygen from the air is prevented by the occurrence of polarization of gas which is difficult to permeate on the surface of the oxygen permselective membrane 5 immediately after the air begins to permeate through the oxygen permselective membrane 5. In order to prevent the phenomina as mentioned above, the fresh air should be supplied continuously, so that a large percentage of the pressurized fresh air is exhausted. It is preferable that the energy consumption for making the air enriched with oxygen be as small as possible from the aspect of saving energy. Accordingly, it is evident that depressurizing the backside of the oxygen permselective membrane 5 by the vacuum pump 6 is superior to pressurizing the frontside of the oxygen permselective membrane 5. In case of depressurizing the backside of the oxygen permselective membrane 5, the air is liable to pulsate in the piping line 4. Thereupon, the fan 7 is provided at the downstream portion of the vacuum pump 6 in order to prevent the pulsation of the air from reaching the burner 2.

A bypass piping line 8 equiped with a control valve 9 is provided on the piping line 4 for connecting the upstream side and the downstream side of the vacuum pump 6. At the upstream portion of the vacuum pump 6, a piping line 13 equipped with a control valve 14 is connected with the upstream portion of the connecting point of the bypass piping line 8 and the piping line 4, and the end of the piping line 13 is open to the atmosphere. At the downstream portion of the vacuum pump 6, a piping line 11 equipped with a control valve 12 is connected with the downstream portion of the fan 7, and the end of the piping line 11 is open to the atmosphere.

A control valve 15 for controlling the quantity of the oxygen rich air flowing to the burner 2 and adjusting the combustion temperature of the burner to a predetermined temperature is provided at a portion 4a of the piping line 4 between the fan 7 and the burner 2. Moreover, valves 16, 17 and 18 for controlling the quantity of the flowing air are provided at the portion 4a of the piping line 4. The air enriched with oxygen from the fan 7 is supplied via control valves 16 and 15 to the burner 2. When the opening of the control valve 15 is small, the air enriched with oxygen from the fan 7 flows to a holder or storage device 21 via a piping line 19 equipped with the valve 17 and a piping line 20 equipped with the valve 18. The holder 21 has a cap-like case 22 which is water-sealed and is capable of moving up and down, and has a construction well-known to persons skilled in the art.

By providing the holder 21 as mentioned above, the surplus air enriched with oxygen which is supplied to the burner 2 is held temporarily in the holder 21. Accordingly, as the flow of the air enriched with oxygen can be increased with the load of the burner 2 when the load is changed on a large scale, the combustion apparatus has superior advantages from the aspect of saving energy. Furthermore, as the quantity of air enriched with oxygen which can be supplied to the burner 2 is larger than the quantity of the air enriched with oxygen which permeates through the oxygen permselective membrane 5, the composition elements, such as the oxygen permselective membrane 5, the vacuum pump 6, the fan 7 and so on with relation to the oxygen permselective membrane 5, can be of small size.

A body 25 of the burner 2 is equipped with an atomizing nozzle 26 and an air nozzle 27 arranged coaxially. A first flow path 28 is formed in the atomizing nozzle 26. A second flow path 29 is formed between the atomizing nozzle 26 and the air nozzle 27. A third flow path 30 is formed between the air nozzle 27 and the body 25. A burner tile 31 is provided in front of the body 25. The liquid fuel is supplied to the first flow path 28 which is positioned at the most inner position in the direction of the radius of the burner 2. Air is supplied from a forced draft fan 32 to the third flow path 30 which is positioned at the most outer position in the direction of the radius of the burner 2. The air enriched with oxygen from the oxygen permselective membrane 5 is supplied via the piping line 4 to the second flow path 29.

In burner 2 the liquid fuel flowing through the first flow path 28 is atomized at the front end of the burner 2 by the air enriched with oxygen which is flowing through the second flow path 29. Accordingly, the atomized liquid fuel is mixed with the air enriched with oxygen and combustion at a high temperature can be achieved.

Let us assume the case of changing the quantity of the air enriched with oxygen for combustion and changing the oxygen concentration of the air enriched with oxygen for combustion. When the differential pressure through the oxygen permselective membrane 5 is for example 600 mmHg, the oxygen concentration of the air permeated through the oxygen permselective membrane 5 is for example 31%. In this state, for decreasing the oxygen concentration of the air supplied to the burner 2 to about 25%, the control valve 14 is opened so as to induce atmospheric air into the piping line 4. Then, although the oxygen concentration of the combustion air is decreased, the quantity of the combustion air is increased. Next, the control valve 9 is opened so as to keep the induction pressure of the vacuum pump 6 uniform. Accordingly, combustion air, the quantity of which is uniform and the oxygen concentration of which is decreased, can be supplied to the burner 2. In the case of keeping the oxygen concentration of the combustion air uniform and decreasing the quantity of the combustion air, the opening of the control valve 15 is decreased and the opening portion of the control valve 12 is enlarged. Then a part of the combustion air from the fan 7 is exhausted via the piping line 11 to the atmosphere, and the quantity of the combustion air supplied to the burner 2 is decreased.

In the case of varying the quantity and the oxygen concentration of the combustion air at the same time, the control valves 12 and 14 are closed and the opening portion of the control valve 9 on the bypass piping line 8 is controlled with opening the control valve 15. Then, the induction pressure of the vacuum pump 6 is adjusted. Accordingly, as the differential pressure through the oxygen permselective membrane 5 is varied, the oxygen concentration and the quantity of the combustion air are varied at the same time as shown in FIG. 2.

Figure 3:
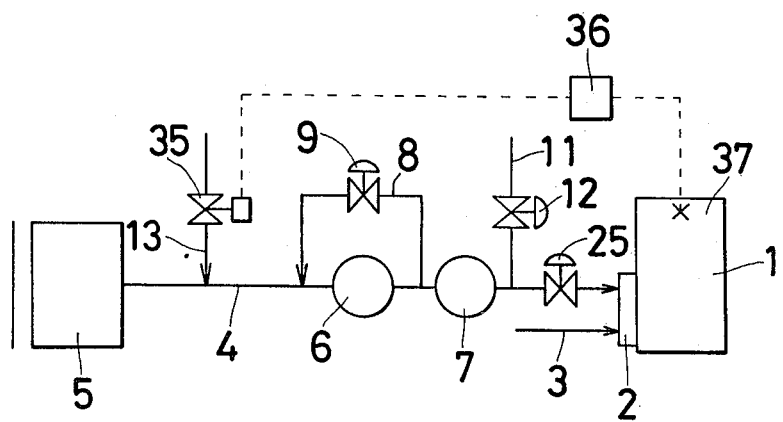
FIG. 3 is a schematic view of another embodiment of the invention.

FIG. 3 is a flow sheet of another preferred embodiment of the present invention, in which portions corresponding to those in FIG. 1 are designated by the same reference numerals. In this embodiment, a solenoid valve 35 is provided instead of the control valve 14. The combustion furnace 1 is provided with a temperature detecting element 37, and a temperature detected by the temperature detecting element 37 is received by a temperature controller 36. At the temperature controller 36 a temperature is predetermined, the solenoid valve 35 is opened until the detected temperature reaches the predetermined temperature, and solenoid valve 35 is closed when the detected temperature becomes higher than the predetermined temperature.

Such an embodiment is effective in raising the temperature of a bach type furnace used for the combustion furnace 1. In other words heat transfer rate is changed according to the difference in temperature between objects to be heated and flame in the furnace, so that the heat transfer rate is lowered by decreasing the difference in temperature when the temperature in the furnace is high. In this case, if air enriched with oxygen is used for combustion, the difference in temperature is large, which makes the heat transfer rate increase. Accordingly, increasing the heat transfer rate results in high thermal efficiency. Then, by means of fuel being combusted with air which is induced via the piping line 13 and which is not enriched with oxygen, power combustion may be reduced greatly in the vacuum pump 6 while the combustion fornace is at a low temperature.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A combustion apparatus for combusting fuel in a combustion furnace by utilizing air which is enriched with oxygen, said apparatus comprising:
    an oxygen permselective membrane for enriching air with oxygen;

a first piping line having a vacuum pump for feeding said air enriched with oxygen to the combustion furnace;

a bypass piping line connected to said first piping line at the upstream side and the downstream side of said vacuum pump, said bypass piping line being equipped with a control valve;

a second piping line having a first end connected with said first piping line between said vacuum pump and said oxygen permselective membrane and a second end open to the atmosphere, said second piping line being equipped with a control valve; and a third piping line having a first end connected with said first piping line between said vacuum pump and the combustion furnace and a second end open to the atmosphere, said third piping line being equipped with a control valve.

2. A combustion apparatus as claimed in claim 1, further comprising air storage means connected to said first piping line between said vacuum pump and the combustion furance.

3. A combustion apparatus as claimed in claim 1, further comprising a burner having a first flow path, a second flow path, and a third flow path, arranged coaxially from a radially inner position to a radially outer position of said burner, said first flow path being supplied with liquid fuel, said second flow path being supplied with said air enriched with oxygen through said permselective membrane, and said third flow path being supplied with air.

* * * * *